United States Patent Office 3,264,373
Patented August 2, 1966

3,264,373
GRAFT COPOLYMERS OF METHYL METHACRYLATE ONTO BUTADIENE-ALKYL ACRYLATE COPOLYMERS AND VINYL CHLORIDE RESINS CONTAINING SAME
Clyde J. Whitworth, Jr., Nathan L. Zutty, and Frederick P. Reding, Charleston, W. Va., assignors to Union Carbide Corporation, a corporation of New York
No Drawing. Filed Dec. 17, 1962, Ser. No. 244,924
14 Claims. (Cl. 260—876)

This invention relates to vinyl chloride polymer compositions having improved impact strength. More particularly, this invention relates to uniform blends of a vinyl chloride polymer with a graft polymer of methyl methacrylate on a copolymer of butadiene and an alkyl acrylate, which blends have improved impact strength over the corresponding vinyl chloride polymer.

Vinyl chloride polymers are widely employed because of their generally excellent chemical and physical properties. However, many of these polymers, particularly those of high vinyl chloride content, for example 80 weight percent or more polymerized vinyl chloride, are characterized by poor impact strength. Attempts to improve the impact strength of these vinyl chloride polymers have centered primarily on blending a second, generally rubber-based polymer with the vinyl chloride polymer. These attempts have met with more or less limited success, primarily because no polymer additive has been found which would provide a vinyl chloride polymer composition having the desired high impact strength without seriously reducing the heat distortion temperature of the vinyl chloride polymer.

Applicants have now discovered that certain graft polymers, when blended with vinyl chloride polymers, provide compositions having superior impact strength. Moreover, the resulting vinyl chloride compositions have heat distortion temperatures which are only slightly lower than, and often are the same as or higher than, the heat distortion temperature of the unmodified vinyl chloride polymer.

The graft polymers which are employed in improving the impact strength of vinyl chloride polymers according to this invention are those in which methyl methacrylate has been grafted onto a butadiene/alkyl acrylate copolymer "backbone." These graft polymers are produced by methods known to those skilled in the art. It is preferred, however, to employ emulsion polymerization techniques. In these techniques, butadiene and an alkyl acrylate are charged to a vessel together with water, an emulsifying agent and a free radical catalyst. The mixture is then heated at a temperature of from about 0° C. to about 80° C., preferably from about 40° C. to about 60° C., to effect the polymerization, which is carried to a conversion of at least about 75 percent completion, and preferably to completion. Then methyl methacrylate is charged to the reaction mixture, together with additional water, emulsifying agent and catalyst, and the polymerization is again carried out to produce the graft polymer.

In general, the polymerization mixture contains from about 1 to about 10 or more parts by weight of water per part of monomer charged, from about 0.001 to about 0.1 part by weight of emulsifying agent per part of monomer charged, and from about 0.001 to about 0.5 part by weight of catalyst.

Compounds which are suitable as emulsifying agents generally contain hydrocarbon groups having from 8 to 22 carbon atoms which are bonded to highly polar groups, such as alkali metal and ammonium carboxylate groups, sulfate half-ester groups, sulfonate groups, phosphate partial ester groups and the like. As examples of suitable emulsifying agents one can mention sodium oleate, sodium stearate, sodium sulfate esters of fatty alcohols derived from natural oils such as cocoanut oil, sodium salts of sulfosuccinic esters such as sodium dioctyl sulfosuccinate, sodium salts of alkylated benzene and naphthalene sulfonic acids such as sodium didodecyl naphthalene sulfonate, sodium salts of monosulfonated fatty monoglycerides, etc. In addition one can employ high molecular weight, water-soluble polyethers such as the nonylphenyl ether of polyethylene glycol and the like.

The free radical catalysts which can be employed include hydrogen peroxide, p-chlorobenzoyl peroxide, capryloyl peroxide, cumene hydroperoxide, benzoyl peroxide, lauroyl peroxide, tert.-butyl hydroperoxide, alkali metal or ammonium persulfates, perborates, peracetates, percarbonates, and the like. It is preferred, however, to employ a "redox" system in which, in addition to a peroxide compound, there is employed a reducing agent such as a metal, for example iron or cobalt, sulfur dioxide, alkali metal sulfites, bisulfites, sulfoxylates, hyposulfites, thiosulphates, and the like.

In addition to the foregoing materials the polymerization mixture can contain well-known agents for the control of the reaction, such as chain transfer agents, for example, higher alkyl mercaptans such as dodecyl mercaptan, to control the molecular weight of the polymer, etc.

The butadiene/alkyl acrylate copolymer employed as the "backbone" of the graft polymer contains from about 1 to about 20 weight percent polymerized butadiene. Copolymers containing from about 1 to about 12 weight percent polymerized butadiene are preferred.

The alkyl acrylates which are employed in producing the butadiene/alkyl acrylate backbone of the graft polymer are those whose homopolymers have heat distortion temperatures of less than about 0° C., as determined according to ASTM D648–56. In general, such monomers have from 2 to 12 carbon atoms, inclusive, in the alkyl group thereof. It is preferred that the alkyl group have no branching on the carbon atom bonded to the acryloxy group. As examples of suitable monomers of this preferred class one can mention ethyl acrylate, n-propyl acrylate, n-butyl acrylate, 2-methylbutyl acrylate, 3-methylbutyl acrylate, amyl acrylate, n-hexyl acrylate, 2-ethylhexyl acrylate, n-octyl acrylate and the like. Monomers having branching on the carbon atom bonded to the acryloxy group, such as isopropyl acrylate, sec.-butyl acrylate, sec.-amyl acrylate and the like are less desirable because they generally provide a harder, less resilient graft polymer, the vinyl chloride polymer blends of which lack the high impact strength and flexibility desired for many applications.

The amount of methyl methacrylate which is grafted onto the butadiene/alkyl acrylate copolymer backbone can vary from about 10 to about 185 weight percent, based on the weight of butadiene/alkyl acrylate copolymer, with amounts of from about 20 to about 50 weight percent methyl methacrylate being preferred. The resulting graft polymer thus contains from about 9 to about 65 weight percent polymerized methyl methacrylate, from about 0.5 to about 18 weight percent polymerized butadiene, and from about 30 to about 90 weight percent polymerized alkyl acrylate. The preferred graft polymers contain from about 16 to about 34 weight percent polymerized methyl methacrylate, from about 1 to about 8 weight percent polymerized butadiene, and from about 60 to about 70 weight percent polymerized alkyl acrylate.

A critical feature of this invention is that the methyl methacrylate be grafted on the butadiene/alkyl acrylate copolymers; a blend of a vinyl chloride polymer and a conventional copolymer produced by the simultaneous polymerization of methyl methacrylate with butadiene and an alkyl acrylate, although having improved impact strength, has a heat distortion temperature which is much less than the heat distortion temperature of the unmodified vinyl chloride polymer.

The graft polymer-vinyl chloride polymer blends of this invention contain from about 0.5 to about 50 weight percent, based on the weight of vinyl chloride polymer, of the graft polymer, with amounts of graft polymer in the blend of from about 1 to about 30 weight percent being preferred. The blending of the graft polymer impact modifier with the vinyl chloride polymer can be accomplished by methods known to those skilled in the art, such as by solvation procedures or by mechanical blending. A preferred procedure when the vinyl chloride polymer and the graft polymer are each produced by emulsion polymerization techniques is to admix the vinyl chloride polymer latex with the graft polymer latex and precipitate the polymers by known procedures, such as by admixing the latex mixture with methanol. The resulting polymeric product is a uniform blend of the vinyl chloride polymer and the graft polymer.

By the term "graft polymer" as employed in the specification and claims is meant a copolymer of butadiene and an alkyl acrylate onto which methyl methacrylate has been grafted.

By the term "vinyl chloride polymer" as employed in the specification and claims is meant poly(vinyl chloride) and copolymers of vinyl chloride with one or more olefinically unsaturated polymerizable comonomers containing at least 80 weight percent polymerized vinyl chloride. As examples of possible comonomers one can mention vinylidene halides such as vinylidene chloride and vinylidene fluoride; vinyl esters such as vinyl acetate, vinyl propionate, vinyl butyrate, vinyl chloroacetate, vinyl benzoate and the like; acrylic and α-alkyl acrylic acids, their alkyl esters, amides and nitriles such as acrylic acid, methacrylic acid, ethacrylic acid, methyl acrylate, ethyl acrylate, 2-ethylhexyl acrylate, methyl methacrylate, butyl methacrylate, acrylamide, N-methyl acrylamide, N,N-dimethyl acrylamide, acrylonitrile, methacrylonitrile and the like; vinyl aromatic compounds such as styrene, vinyl naphthalene and the like; olefinically unsaturated hydrocarbons such as ethylene, bicyclo [2.2.1]hept-2-ene, bicyclo [2.2.1]hepta-2,5-diene, and the like, etc.

In addition to the vinyl chloride polymer and the graft polymer impact modifier of this invention, the blends can contain well-known additives for vinyl chloride polymers such as dyes, pigments, plasticizers, and the like.

The following examples are illustrative of this invention. The following tests were employed in evaluating the polymer compositions in the examples.

(1) *Heat distortion temperature.*—Determined from a 0.5" x 0.5" x 5" compression-molded bar at a fiber stress of 264 p.s.i. according to ASTM D648–56.

(2) *Gardner impact test.*—Determined from a 3"-diameter and 0.080"-thick compression-molded disk.

(3) *Reduced viscosity.*—Determined at 30° C. from a solution of 0.2 gram of vinyl chloride polymer in 100 milliliters of cyclohexanone at 30° C.

EXAMPLE 1

A reaction vessel was charged with 20 grams of butadiene, 180 grams of butyl acrylate, 800 grams of distilled water, 4 grams of the nonylphenyl ether of polyethylene glycol, 2 grams of sodium lauryl sulfate, 4 grams of ammonium persulfate, 2 grams of sulfur dioxide and 0.04 gram of iron powder. The vessel was sealed and heated at 50° C. for 8 hours. After cooling, 838 grams of distilled water, 170 grams of methyl methacrylate, 2 grams of the nonylphenyl ether of polyethylene glycol, 1.7 grams of ammonium persulfate, and 1.7 grams of sulfur dioxide were added. The vessel was again sealed and heated at 50° C. for 5 hours. The reaction mixture was cooled to room temperature and poured into methanol whereby a graft terpolymer of methyl methacrylate on a butadiene/butyl acrylate copolymer, hereinafter referred to as a "methyl methacrylate/(butadiene/butyl acrylate) graft terpolymer" was precipitated. After filtering from the methanolic mixture and drying at 55° C. the graft terpolymer weighed 370 grams and contained 46 weight percent polymerized methyl methacrylate, 5.4 weight percent polymerized butadiene and 48.6 weight percent polymerized butyl acrylate.

A portion of the methyl methacrylate/butadiene/ butyl acrylate) graft terpolymer was fluxed with poly (vinyl chloride) having a reduced viscosity of 0.55 on a two-roll mill at a temperature of 165° C. for 5 minutes to produce a blend containing 10 weight percent graft terpolymer and 90 weight percent poly(vinyl chloride). The blend also contained 1.5 weight percent, based on total polymer weight, of dibutyl tin dilaurate added as a stabilizer. Additional blends containing 20 and 30 weight percent graft terpolymer and 80 and 70 weight percent poly(vinyl chloride), respectively, were produced in a similar manner. Portions of each blend were compression molded at 175° C. for one minute to produce the specimens which were tested for impact strength and heat distortion temperature. The results of these tests, together with equivalent tests conducted on samples of the graft terpolymer and the unmodified poly(vinyl chloride), are set forth in Table I.

*Table I*

| Polymer Composition | | Heat Distortion Temperature, ° C. | Gardner Impact Strength, in. lb. |
|---|---|---|---|
| Graft Terpolymer, weight percent | Poly(vinyl chloride), weight percent | | |
| 10 | 90 | 69 | 252 |
| 20 | 80 | 70 | 296 |
| 30 | 70 | 73 | 1>320 |
| ---- | 100 | 72 | 10 |
| 100 | ---- | ---- | 85 |

[1] 320 is the maximum value attainable with the test apparatus employed.

From Table I it is readily apparent that the blends of the methyl methacrylate/(butadiene/butyl acrylate) graft terpolymers have greatly improved impact strength over unmodified poly(vinyl chloride) and that little or no lowering of the heat distortion temperature of the poly(vinyl chloride) results.

EXAMPLE 2

Employing materials, apparatus and procedures similar to those described in Example 1, a 28/7.2/64.8 methyl methacrylate/(butadiene/butyl acrylate) graft terpolymer was produced and blended with poly(vinyl chloride). The heat distortion temperature and impact strength of the blends and of the graft terpolymer and the unmodified poly(vinyl chloride) are summarized in Table II.

*Table II*

| Polymer Composition | | Heat Distortion Temperature, ° C. | Gardner Impact Strength, in. lb. |
|---|---|---|---|
| Graft Terpolymer, weight percent | Poly(vinyl chloride), weight percent | | |
| 7.5 | 92.5 | 69 | 275 |
| 10 | 90 | 74 | >320 |
| 20 | 80 | 70 | 320 |
| 30 | 70 | 74 | 286 |
| ---- | 100 | 72 | 10 |
| 100 | ---- | <30 | 70 |

EXAMPLE 3

Employing materials, apparatus and procedures similar to those described in Example 1, a 45/8.25/46.75 methyl methacrylate/(butadiene/butyl acrylate) graft terpolymer was produced and blended with poly(vinyl chloride). The heat distortion temperature and impact strength of the blends and of the graft terpolymer and the unmodified poly(vonyl chloride) are summarized in Table III.

Table III

| Polymer Composition | | Heat Distortion Temperature, °C. | Gardner Impact Strength, in. lb. |
|---|---|---|---|
| Graft Terpolymer, weight percent | Poly(vinyl chloride), weight percent | | |
| 10 | 90 | 73 | 240 |
| 20 | 80 | 72 | 320 |
| 30 | 70 | 74 | 320 |
| ---- | 100 | 72 | 10 |
| 100 | ---- | 65 | 110 |

EXAMPLE 4

Employing materials, apparatus and procedures similar to those described in Example 1, a 46/2.7/51.3 methyl methacrylate/(butadiene/butyl acrylate) graft terpolymer was produced and blended with poly(vinyl chloride). The heat distortion temperature and impact strength of the blends and of the unmodified poly(vinyl chloride) are summarized in Table IV.

Table IV

| Polymer Composition | | Heat Distortion Temperature, °C. | Gardner Impact Strength, in. lb. |
|---|---|---|---|
| Graft Terpolymer, weight percent | Poly(vinyl chloride), weight percent | | |
| 20 | 80 | 71 | >320 |
| 30 | 70 | 73 | >320 |
| ---- | 100 | 72 | 10 |

EXAMPLE 5

Bicyclo [2.2.1]hepta-2,5-diene was copolymerized with vinyl chloride at 50° C., employing azo-bis-isobutyronitrile as the catalyst. The resulting copolymer contained 88 weight percent polymerized vinyl chloride and 12 weight percent bicyclo [2.2.1]hepta-2,5-diene which had polymerized in the form of the nortricyclene group. The copolymer had a reduced viscosity of 0.83, a heat distortion temperature of 80° C. and a Gardner impact strength of 6.0 in. lb.

Employing apparatus and procedures similar to those described in Example 1, portions of this copolymer were blended with the 28/7.2/64.8 methyl methacrylate/(butadiene/butyl acrylate) graft terpolymer employed in Example 2. The properties of the blends and of the graft terpolymer and the unmodified vinyl chloride copolymer are summarized in Table V.

Table V

| Blend Composition | | Heat Distortion Temperature, °C. | Gardner Impact Strength, in. lb. |
|---|---|---|---|
| Graft Terpolymer, weight percent | Vinyl Chloride Copolymer, weight percent | | |
| 10 | 90 | 83 | 200 |
| 20 | 80 | 83 | >320 |
| 30 | 70 | 76 | 300 |
| ---- | 100 | 80 | 6 |
| 100 | ---- | <30 | 70 |

EXAMPLE 6

Employing apparatus and procedures similar to those described in Example 1, portions of the vinyl chloride/bicyclo[2.2.1]hepta-2,5-diene copolymer described in Example 5 were blened with the 45/8.25/46.75 methyl methacrylate/(butadiene/butyl acrylate) graft terpolymer employed in Example 3. The properties of the blends and of the unmodified copolymer are summarized in Table VI.

Table VI

| Blend Composition | | Heat Distortion Temperature, °C. | Gardner Impact Strength, in. lb. |
|---|---|---|---|
| Graft Terpolymer, weight percent | Vinyl Chloride Copolymer, weight percent | | |
| 20 | 80 | 81 | 110 |
| 30 | 70 | 74 | 310 |
| ---- | 100 | 80 | 6 |
| 100 | ---- | 65 | 110 |

EXAMPLE 7

Employing apparatus and procedures similar to those described in Example 1, the vinyl chloride/bicyclo[2.2.1]hepta-2,5-diene copolymer described in Example 5 was compounded with the 46/5.4/48.6 methyl methacrylate/(butadiene/butyl acrylate) graft terpolymer produced in Example 1 to produce a blend containing 30 weight percent of the graft terpolymer and 70 weight percent copolymer. The blend had a heat distortion temperature of 81° C. and a Gardner impact strength of 300 in. lb. as compared with a heat distortion temperature of 80° C. and a Gardner impact strength of 6.0 in. lb. for the unmodified vinyl chloride/bicyclo-[2.2.1]hepta-2,5-diene copolymer.

EXAMPLE 8

Employing apparatus and procedures similar to those described in Example 1, methyl methacrylate is grafted on a butadiene/2-ethylhexyl acrylate copolymer. The methyl methacrylate/(butadiene/2-ethylhexyl acrylate) graft terpolymer is then admixed with poly(vinyl chloride) to produce a blend having improved impact strength over the unmodified poly(vinyl chloride).

What is claimed is:

1. A composition of matter comprising a uniform admixture of a vinyl chloride polymer containing at least 80 weight percent polymerized vinyl chloride with from 0.5 to 50 weight percent, based on the weight of said vinyl chloride polymer, of a graft polymer consisting of a copolymer of butadiene and an alkyl acrylate whose homopolymer has a heat distortion temperature of less than 0° C., said copolymer containing from 1 to 20 weight percent polymerized butadiene, the balance being polymerized alkyl acrylate, and from 10 to 185 weight percent based on the weight of said copolymer, of methyl methacrylate grafted onto said copolymer.

2. A composition comprising a uniform admixture of a vinyl chloride polymer containing at least 80 weight percent polymerized vinyl chloride and from 0.5 to 50 weight percent, based on the weight of said vinyl chloride polymer, of a graft polymer consisting of a copolymer of butadiene and an alkyl acrylate whose homopolymer has a heat distortion temperature of less than 0° C. having methyl methacrylate grafted thereon, said graft polymer containing from 9 to 65 weight percent polymerized methyl methacrylate, 0.5 to 18 weight percent polymerized butadiene, and from 30 to 90 weight percent polymerized alkyl acrylate.

3. A composition of matter comprising a uniform admixture of a vinyl chloride polymer containing at least 80 weight percent polymerized vinyl chloride with from 0.5 to 50 weight percent, based on the weight of said vinyl chloride polymer, of a graft polymer consisting of methyl methacrylate grafted on a copolymer of butadiene and butyl acrylate, said graft polymer containing from 9 to 65 weight percent polymerized methyl methacrylate, from 0.5 to 18 weight percent polymerized butadiene and from 30 to 90 weight percent polymerized butyl acrylate.

4. A composition of matter comprising a uniform admixture of a vinyl chloride polymer containing at least 80 weight percent polymerized vinyl chloride with from 0.5 to 50 weight percent, based on the weight of said vinyl chloride polymer, of a graft polymer consisting of methyl methacrylate grafted on a copolymer of butadiene and 2-ethylhexyl acrylate, said graft polymer containing from 9 to 65 weight percent polymerized methyl methacrylate, from 0.5 to 18 weight percent polymerized butadiene and from 30 to 90 weight percent polymerized 2-ethylhexyl acrylate.

5. A composition of matter comprising a uniform admixture of a vinyl chloride polymer containing at least 80 weight percent polymerized vinyl chloride with from 1 to 30 weight percent, based on the weight of said vinyl chloride polymer, of a graft polymer consisting of methyl methacrylate grafted on a copolymer of butadiene and butyl acrylate, said graft polymer containing from 16 to 34 weight percent polymerized methyl methacrylate, from 1 to 8 weight percent polymerized butadiene and from 60 to 70 weight percent polymerized butyl acrylate.

6. A composition of matter comprising a uniform admixture of poly(vinyl chloride) with from 1 to 30 weight percent, based on the weight of said poly(vinyl chloride), of a graft polymer consisting of methyl methacrylate grafted on a copolymer of butadiene and butyl acrylate, said graft polymer containing from 16 to 34 weight percent polymerized methyl methacrylate, from 1 to 8 weight percent polymerized butadiene and from 60 to 70 weight percent polymerized butyl acrylate.

7. A composition of matter comprising a uniform admixture of a copolymer of vinyl chloride and bicyclo[2.2.1]hepta-2,5-diene, said copolymer containing at least 80 weight percent polymerized vinyl chloride with from 1 to 30 weight percent, based on the weight of said vinyl chloride copolymer, of a graft polymer consisting of methyl methacrylate grafted on a copolymer of butadiene and butyl acrylate, said graft polymer containing from 16 to 34 weight percent polymerized methyl methacrylate, from 1 to 8 weight percent polymerized butadiene and from 60 to 70 weight percent polymerized butyl acrylate.

8. A composition of matter comprising a uniform admixture of a vinyl chloride polymer containing at least 80 weight percent polymerized vinyl chloride with from 1 to 30 weight percent, based on the weight of said vinyl chloride polymer, of a graft polymer consisting of methyl methacrylate grafted on a copolymer of butadiene and 2-ethylhexyl acrylate, said graft polymer containing from 16 to 34 weight percent polymerized methyl methacrylate, from 1 to 8 weight percent polymerized butadiene and from 60 to 70 weight percent polymerized 2-ethylhexyl acrylate.

9. A composition of matter comprising a uniform admixture of poly(vinyl chloride) with from 1 to 30 weight percent, based on the weight of said poly(vinyl chloride), of a graft polymer consisting of methyl methacrylate grafted on a copolymer of butadiene and 2-ethylhexyl acrylate, said graft polymer containing from 16 to 34 weight percent polymerized methyl methacrylate, from 1 to 8 weight percent polymerized butadiene and from 60 to 70 percent polymerized 2-ethylhexyl acrylate.

10. A composition of matter comprising a uniform admixture of a copolymer of vinyl chloride and bicyclo[2.2.1]hepta-2,5-diene, said copolymer containing at least 80 weight percent polymerized vinyl chloride with from 1 to 30 weight percent, based on the weight of said vinyl chloride copolymer, of a graft polymer consisting of methyl methacrylate grafted on a copolymer of butadiene and 2-ethylhexyl acrylate, said graft polymer containing from 16 to 34 weight percent polymerized methyl methacrylate, from 1 to 8 weight percent polymerized butadiene and from 60 to 70 weight percent polymerized 2-ethylhexyl acrylate.

11. A graft polymer consisting of (1) a copolymer of (a) butadiene and (b) an alkyl acrylate whose homopolymer has a heat distortion temperature of less than 0° C. having (2) methyl methacrylate grafted thereon, said graft polymer containing from 9 to 65 weight percent polymerized methyl methacrylate, from 0.5 to 18 weight percent polymerized butadiene, and from 30 to 90 percent polymerized alkyl acrylate.

12. A graft polymer consisting of a copolymer of butadiene and an alkyl acrylate whose homopolymer has a heat distortion temperature of less than 0° C., said copolymer containing from 1 to 20 weight percent polymerized butadiene and the balance being polymerized alkyl acrylate, and from 10 to 185 weight percent, based on the weight of said copolymer, of methyl methacrylate grafted onto said copolymer.

13. A graft polymer consisting of methyl methacrylate grafted on a copolymer of butadiene and butyl acrylate, said graft polymer containing from 16 to 34 weight percent polymerized methyl methacrylate, from 1 to 8 weight percent butadiene, and from 60 to 70 weight percent polymerized butylacrylate.

14. A graft polymer consisting of methyl methacrylate grafted on a copolymer of butadiene and 2-ethylhexyl acrylate, said graft polymer containing from 16 to 34 weight percent polymerized methyl methacrylate, from 1 to 8 percent butadiene, and from 60 to 70 weight percent polymerized 2-ethylhexyl acrylate.

References Cited by the Examiner

UNITED STATES PATENTS

| | | | |
|---|---|---|---|
| 2,943,074 | 6/1960 | Feuer | 260—876 |
| 3,047,533 | 7/1962 | Calvert | 260—879 |

FOREIGN PATENTS

| | | |
|---|---|---|
| 910,702 | 11/1962 | Great Britain. |
| 1,221,888 | 1/1960 | France. |

SAMUEL H. BLECH, *Primary Examiner.*

MURRAY TILLMAN, *Examiner.*

G. F. LESMES, *Assistant Examiner.*